O. B. RAINES.
TRACTION ENGINE.
APPLICATION FILED APR. 8, 1918.

1,287,097.

Patented Dec. 10, 1918.
3 SHEETS—SHEET 1.

WITNESS:
Wm F. Drew

INVENTOR.
Otis B. Raines
BY
Booth & Booth
ATTORNEYS.

O. B. RAINES.
TRACTION ENGINE.
APPLICATION FILED APR. 8, 1918.

1,287,097.

Patented Dec. 10, 1918.
3 SHEETS—SHEET 2.

WITNESS:
Wm F. Drew

INVENTOR.
Otis B. Raines
BY
Booth & Booth
ATTORNEYS.

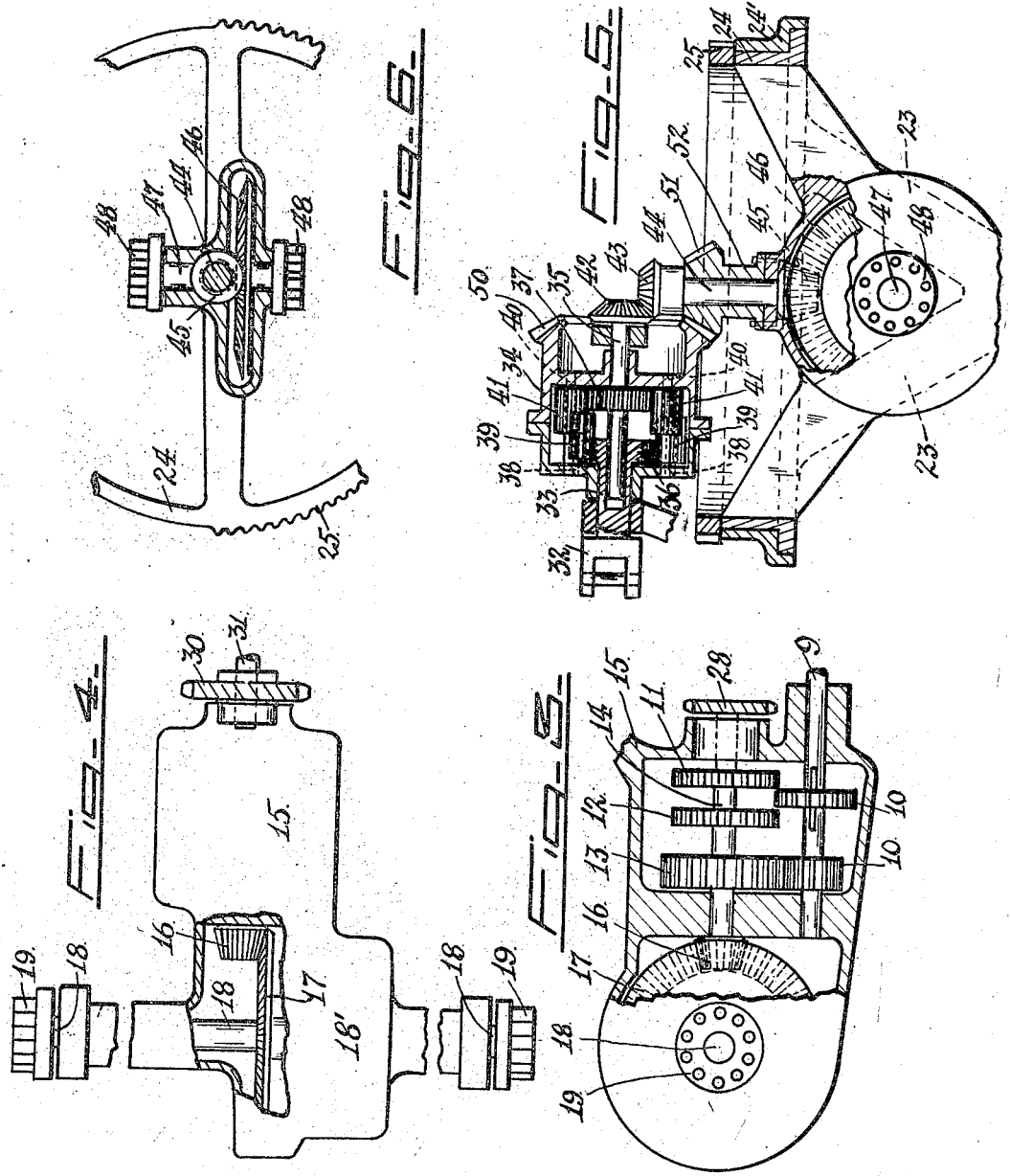

UNITED STATES PATENT OFFICE.

OTIS B. RAINES, OF MOUNTAIN VIEW, CALIFORNIA.

TRACTION-ENGINE.

1,287,097.

Specification of Letters Patent. Patented Dec. 10, 1918.

Application filed April 8, 1918. Serial No. 227,172.

*To all whom it may concern:*

Be it known that I, OTIS B. RAINES, a citizen of the United States, residing at Mountain View, in the county of Santa Clara and State of California, have invented certain new and useful Improvements in Traction-Engines, of which the following is a specification.

My invention relates to the class of tractors, and has particular reference to that type in which the power is applied to all the wheels.

The object of my invention is to provide simple and effective means for transmitting the power to the front wheels without impairing their steering function and control; and to this end my invention consists in the novel traction-engine which I shall hereinafter fully describe by reference to the accompanying drawings, in which—

Fig. 3 is a part sectional detail, enlarged, of the variable speed transmission mechanism.

Fig. 4 is a plan view, enlarged, and partly in section of the variable speed transmission mechanism showing the upper shaft driven thereby.

Fig. 5 is a sectional elevation, enlarged, of the equalizing planetary transmission and mechanism to drive the front wheels.

Fig. 6 is a detail plan section of the lower portion of the front wheel drive.

Figure 1:
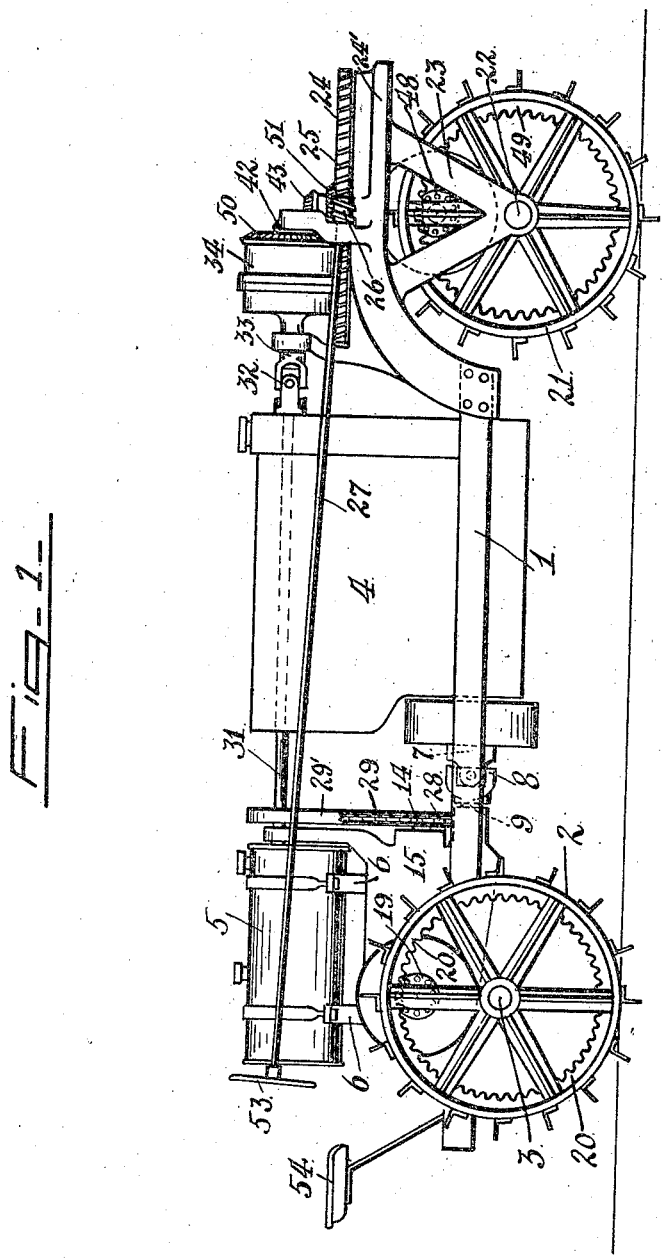
Figure 1 is a side elevation of the machine.

1 is the tractor frame, having at the rear the wheels 2 mounted for independent rotation upon a fixed axle 3.

These rear wheels are driven by a motor indicated diagrammatically by 4, and supplied with fuel from a tank 5 carried by brackets 6 or other suitable supports from the frame.

The motor shaft 7 is coupled by a knuckle at 8 to a shaft 9 (see Fig. 3) the power of which is transmitted through any suitable form of variable speed mechanism herein sufficiently indicated in Fig. 3 as comprising a variable speed device of the selective gear type involving the slide gears 10, coacting with the high gear 11, reverse 12 and low gear 13, the latter gears being mounted on a shaft 14, all inclosed in a suitable gear case 15 and the slide gears being operated by any usual connections, unnecessary to show. The rear end of the variable speed shaft 14 carries a bevel pinion 16 which meshes with a bevel gear 17 on a cross shaft 18 lying above and parallel with the axle, said cross shaft carrying roller pinions 19, as shown in Fig. 4, which mesh with internal gears 20 carried by the wheels 2, as seen in Fig. 1. 18', Fig. 4, indicates the differential in the shaft 18.

21 are the front wheels one on each side, both carried on an axle 22 mounted in suitable forks 23 depending from a turntable 24 mounted suitably in a table frame 24' of the frame 1.

Figure 2:
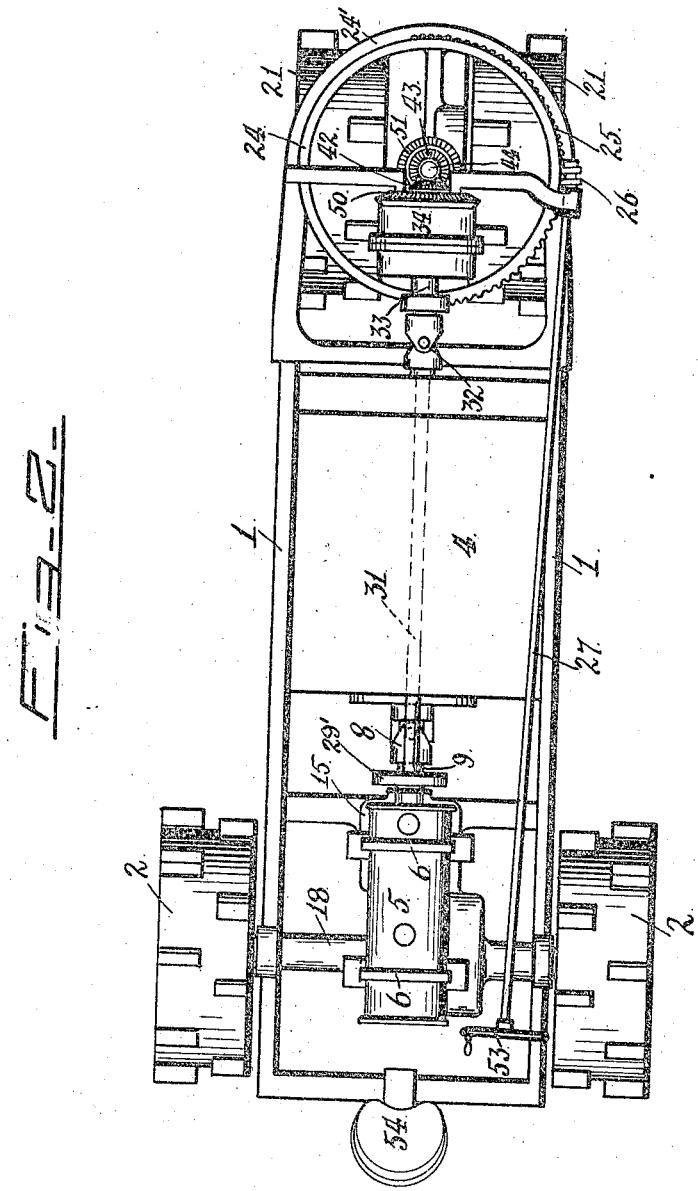
Fig. 2 is a top plan view of the same.

Steering movement is imparted to the front wheels 21, through a worm gear 25, Figs. 1 and 2, carried by the turntable 24, with which worm gear a worm pinion 26 on the steering rod 27 engages, said rod being operated by a hand crank wheel 53 under the control of the driver on the seat 54.

The front wheels 21 are driven by mechanism as follows:—From the variable speed shaft 14 motion is transmitted from a sprocket 28 thereon, Fig. 3, through a chain 29, Fig. 1, in a housing 29', to a sprocket 30, Fig. 4, on a forwardly extending shaft 31, which by a knuckle 32 is coupled to the entering shaft 33 of a planetary transmission, comprising parts and functions as follows, and shown best in Fig. 5.

34 is a housing mounted for rotation on its axis. Into one side of this housing and rotatable therein leads the entering shaft 33 which is hollow in order to receive and furnish a long bearing for the issuing shaft 35 which enters the housing from the other side and is rotatable therein.

The first or entering shaft 33 carries a gear 36, and the second or issuing shaft carries a gear 37.

Mounted on short shafts 38 carried by the housing 34 is a series of pinions 39 which mesh with the gear 36, and on other shafts 40 carried by the housing is a series of pinions 41 which mesh with the gear 37.

The corresponding pinions of the two series 39 and 41, overlap and intermesh, as shown in Fig. 5. The effect is that the power of the entering shaft 33 is transmitted to rotate the issuing shaft 35 in the opposite direction, while the housing 34 tends to turn in a direction opposite to the issuing shaft.

The forward end of the issuing shaft 35 carries a bevel pinion 42 which meshes with a bevel pinion 43 on the upper end of a vertical spindle 44, which passes axially through the turntable and carries on its lower end a bevel pinion 45. This latter pinion meshes with a bevel gear 46 on a cross shaft 47 lying above and parallel with the axle of the front wheels. The cross shaft 47 carries, as shown in Fig. 6, roller pinions 48 which mesh with internal gears 49 carried by the front wheels, Fig. 1.

Thus the front wheels are driven.

In order to counteract the tendency of the turntable to move on its axis under strains imposed on the front wheels tending to retard their rotation, and thus to equalize the resistance to the normal operation of steering through the rod 27, the rotatable housing 34 of the planetary transmission is provided on its front side with an annular bevel gear 50 which meshes with a bevel gear 51, on a sleeve 52, surrounding the spindle 44 and secured at its lower end to the turntable.

Thus the turntable is automatically held and the strains equalized, so that it can be properly controlled for steering purposes through the steering rod 27.

I claim:—

1. In a traction-engine, the combination of rear wheels; a motor; power transmitting connections from the motor to drive the rear wheels; front wheels; a turntable associated with the front wheels; means for operating the turntable to steer said wheels; power transmitting connections leading through the axis of the turntable to drive the front wheels; and means associated with said last named connections for automatically counteracting the turning tendency of the turntable under load strain imposed on the front wheels.

2. In a traction-engine, the combination of rear wheels; a motor; power transmitting connections comprising a variable speed shaft to drive the rear wheels; front wheels; a turntable associated with said front wheels; means for operating the turntable to steer said wheels; power transmitting connections from the variable speed shaft, leading through the axis of the turntable to drive the front wheels; and means associated with said last named connections for automatically counteracting the turning tendency of the turntable under load strain imposed on the front wheels.

3. In a traction-engine, the combination of rear wheels; a motor; power transmitting connections from the motor to drive the rear wheels; front wheels; a turntable associated with said front wheels; means for operating the turntable to steer said wheels; and power transmitting connections leading through the axis of the turntable to drive the front wheels and to automatically counteract the turning tendency of the turntable under load strain imposed on the front wheels, said connections comprising a planetary gear system including gears to drive the wheels and oppositely moving gears affecting the turntable.

4. In a traction-engine, the combination of rear wheels; a motor; power transmitting connections comprising a variable speed shaft to drive the rear wheels; front wheels; a turntable associated with said front wheels; means for operating the turntable to steer said wheels; power transmitting connections from the variable speed shaft, leading through the axis of the turntable to drive the front wheels and to automatically counteract the turning tendency of the turntable under load strain imposed on the front wheels, said connections comprising a planetary gear system including gears to drive the wheels and oppositely moving gears affecting the turntable.

5. In a traction-engine, the combination of motor driven rear wheels; front steering wheels; a turntable through which the front wheels are steered; and means for driving said front wheels consisting of a motor driven shaft; a rotatable housing into one side of which said shaft enters; a gear on said shaft within the housing; a second shaft entering the other side of the housing; a gear on said second shaft within the housing; a double annular series of pinions carried by the housing, said pinion series meshing respectively with the shaft gears and also overlapping and intermeshing with each other; gearing between said second shaft and the front wheels, and gearing between said housing and the turntable.

6. In a traction-engine, the combination of rear-wheels; a motor; power transmitting connections including a variable speed mechanism to drive the rear wheels; front steering wheels; a turntable through which the front wheels are steered; and means for driving said front wheels, consisting of a shaft, connections to drive said shaft from the variable speed mechanism; a rotatable housing into one side of which said shaft enters; a gear on said shaft within the housing; a second shaft entering the other side of the housing; a gear on said second shaft within the housing; a double annular series of pinions carried by the housing, said pinion series meshing respectively with the shaft gears and also overlapping and intermeshing with each other, gearing between said second shaft and the front wheels, and gearing between said housing and the turntable.

7. In a traction-engine, the combination of motor driven rear wheels; front steering wheels; a turntable through which the front wheels are steered; and means for driving said front wheels consisting of a motor driven shaft; a rotatable housing into one side of which said shaft enters; a gear on said shaft within the housing; a second shaft entering the other side of the housing;

a gear on said second shaft within the housing; a double annular series of pinions carried by the housing, said pinion series meshing respectively with the shaft gears and also overlapping and intermeshing with each other; a rotatable spindle passing down through the axis of the turntable; gears to drive said spindle from said second shaft; a cross shaft; gears to drive said cross shaft from the spindle; gears to drive the front wheels from the cross shaft; a sleeve secured to the turntable and surrounding the spindle; and gears connecting the revoluble housing and the sleeve.

8. In a traction-engine, the combination of rear-wheels; a motor; power transmitting connections including a variable speed mechanism to drive the rear wheels; front steering wheels; a turntable through which the front wheels are steered; and means for driving said front wheels, consisting of a shaft, connections to drive said shaft from the variable speed mechanism; a rotatable housing into one side of which said shaft enters; a gear on said shaft within the housing; a second shaft entering the other side of the housing; a gear on said second shaft within the housing; a double annular series of pinions carried by the housing, said pinion series meshing respectively with the shaft gears and also overlapping and intermeshing with each other; a rotatable spindle passing down through the axis of the turntable; gears to drive said spindle from said second shaft; a cross shaft; gears to drive said cross shaft from the spindle; gears to drive the front wheels from the cross shaft; a sleeve secured to the turntable and surrounding the spindle; and gears connecting the revoluble housing and the sleeve.

In testimony whereof I have signed my name to this specification in the presence of two subscribing witnesses.

OTIS B. RAINES.

Witnesses:
 WM. F. BOOTH,
 D. B. RICHARDS.